US005808299A

United States Patent [19]

Syage

[11] Patent Number: 5,808,299
[45] Date of Patent: Sep. 15, 1998

[54] REAL-TIME MULTISPECIES MONITORING BY PHOTOIONIZATION MASS SPECTROMETRY

[75] Inventor: Jack Syage, Cypress, Calif.

[73] Assignee: Syagen Technology, Cypress, Calif.

[21] Appl. No.: 802,004

[22] Filed: Feb. 18, 1997

Related U.S. Application Data

[63] Continuation-in-part of Ser. No. 626,294, Apr. 1, 1996, abandoned.

[51] Int. Cl.[6] .............................. B01D 59/44; H01J 49/00

[52] U.S. Cl. ......................... 250/288; 250/423 P; 250/282

[58] Field of Search .................................. 250/281, 28 L, 250/288, 292, 423 P

[56] References Cited

U.S. PATENT DOCUMENTS

| | | | |
|---|---|---|---|
| 4,365,157 | 12/1982 | Unsold et al. | 250/423 P |
| 4,733,073 | 3/1988 | Becker et al. | 250/288 |
| 5,070,240 | 12/1991 | Lee et al. | 250/288 |
| 5,311,016 | 5/1994 | Villa-Aleman | 250/282 |
| 5,338,931 | 8/1994 | Spangler et al. | 250/423 P |
| 5,397,895 | 3/1995 | Leone et al. | 250/423 P |
| 5,412,207 | 5/1995 | Micco et al. | 250/292 |
| 5,469,323 | 11/1995 | Kanayama | 250/292 |
| 5,527,731 | 6/1996 | Yamamoto et al. | 250/281 |
| 5,554,846 | 9/1996 | Rejiec et al. | 250/288 |
| 5,569,917 | 10/1996 | Buttrill et al. | 250/292 |

OTHER PUBLICATIONS

Mahon, et al. "Third–Harmonic Generation in Agron, Krypton, and Xenon: Bandwidth Limitations in the Vicinity of Lyman–a", IEEE Journal of Quantum Electronics, vol. QE–15, No. 6, Jun. 1979, pp. 44–451.

Rettner, et al., "Pulsed Free Jets: Novel Nonlinear Media for Generation of Vacuum Ultraviolet and Extreme Ultraviolet Radiation", The Journal of Physical Chemistry, vol. 88, No. 20, 1984, pp. 4459–4465.

(List continued on next page.)

*Primary Examiner*—Bruce Anderson
*Attorney, Agent, or Firm*—Blakely Sokoloff Taylor & Zafman

[57] ABSTRACT

A monitor that photo-ionizes trace constituents within a quadrupole ion trap (QIT). The QIT may have a valve that discharges a gas specimen into a trap chamber or a gas line that continuously discharges a gas specimen into the QIT. The trap chamber is surrounded by a ring, and an extractor plate that has an orifice. The trace molecules within the air may be ionized at the nozzle of the valve by a photo-ionizer. Photo-ionizing at the valve nozzle provides a relatively high density of ionized molecules. The photo-ionizer may be either a pulsed light source or a continuous wave light source. The trace molecules are preferably ionized with energy between 8.0 and 11.0 electron volts (eV). The energy is selected to ionize the trace molecules without fragmenting the trace constituents. A radio frequency or other oscillating frequency voltage potential is applied to the ring to trap the ionized trace molecules within the trap chamber. A voltage pulse is applied to the extractor plate to pull the ionized molecules out of the chamber and through the orifice. The extracted ionized molecules are then accelerated to a detector. The monitor has a time of flight analyzer to measure the mass of the trace constituents in the specimen.

10 Claims, 5 Drawing Sheets

OTHER PUBLICATIONS

Tonkyn, et al., "Compact Vacuum Ultraviolet Source for Photoelectron Spectroscopy," Rev. Sci. Instrum. vol. 60, No. 7, Jul. 1989, pp. 1245–1251.

R. Wallenstein, "Generation of Narrowband Tunable VUV Radiation at the Lyman–a Wavelength," Optics Communications, vol. 33, No. 1, Apr. 1980, pp. 119–112.

Hilbig, et al., "Tunable VUV Radiation Generated by Two––Photon Resonant Frequency Mixing in Xenon," IEEE Journal of Quantum Electornics, vol. QE–19, No. 2, Feb. 1983, pp. 194–201.

Jack A. Syage, "Real–Time Detection of Chemical Agents Using Molecular Beam Laser Mass Spectrometry," American Chemical Society, 1990.

David M. Lubman, "Lasers and Mass Spectrometry," Opford University Press, 1990, pp. 469–489.

Nesselrodt, et al., "Cyclic Ketone Mixture Analysis Using 2 + 1 Resonance–Enhanced Multiphoton Ionization Mass Spectrometry" Anal. Chem., 1994, vol. 66, pp. 2497–2504.

Frey, et al., "Real–Time Vehicle Exhaust Analysis Using a Laser TOF Mass Spectrometer" Proc. 40th Anal. Conf. Mass Spectrom & Allied Topics, 192, pp. 678–679.

Tembreull, et al., "Pulsed Laser Desorption of Biological Molecules in Supersonic Beam Mass Spectrometry with Resonant Two–Photon Ionization Detection" Anal. Chem., 1987, vol. 59, pp. 1082–1088.

REAL-TIME MULTISPECIES MONITORING BY PHOTOIONIZATION MASS SPECTROMETRY

CROSS-REFERENCES TO RELATED APPLICATIONS

This application is a continuation-in-part of application Ser. No. 08/626,294, filed on Apr. 1, 1996, entitled REAL-TIME MULTISPECIES MONITORING BY LASER MASS SPECTROMETRY now abandoned.

BACKGROUND OF THE INVENTION

1. Field of the Invention

The present invention relates to laser mass spectrometry.

2. Description of Related Art

Although historically utilized in laboratories, mass spectrometers have many potential commercial applications. For example, a mass spectrometer may be employed in a military field to determine the existence of a chemical agent(s), or placed next to an industrial site to monitor toxic emissions.

In general, mass spectrometers ionize various molecular constituents within a volume of air and then accelerate the ionized molecules to a detector. In one type of mass spectrometer, a magnetic field is applied to deflect the ionized molecules. The amount of deflection is dependent upon the mass of the molecule. The different molecular constituents can be determined by measuring the ion intensity detected at different deflection angles. In another type of mass spectrometer the time of flight between the accelerator and the detector is used to determine the constituents of the gas specimen. It being understood that heavier masses will have a longer time of flight than a lighter molecule.

The trace constituents of a gas specimen are sometimes ionized with light pulses in a technique commonly referred to as multiple photon ionization. The photo-ionizer must supply enough energy to excite the trace molecules to an ionization potential. It has been found that multiple photon ionization leads to fragmentation of molecular ions. The fragmented molecules increase the difficulty of detecting and identifying the trace constituents in the gas specimen. Because of molecular ion fragmentation, many commercially available mass spectrometers have elaborate tables and algorithms to determine the identity of the trace constituents. Such analyzers are typically expensive and require an undesirable amount of computing time. It would be desirable to provide a monitor that rapidly and definitively determines the existence and identity of trace constituents and is relatively inexpensive to produce.

Additionally, in a time of flight mass spectrometer the gas specimens are typically photo-ionized near the accelerator grids. The specimen is discharged between the grids by a valve. The density of the gas specimen is proportional to the square of the inverse of the distance from the nozzle of the discharge valve. Therefore the density of the gas decreases as the specimen is discharged from the valve to the accelerator plates. The lower gas density reduces the ion density of the specimen and the accuracy of the spectrometer. It would be desirable to provide a time of flight mass spectrometer that has a relatively high density of ionized trace molecules.

SUMMARY OF THE INVENTION

The present invention is a monitor that photo-ionizes trace constituents within a quadrupole ion trap (QIT). The QIT may have a valve that discharges a gas specimen into a trap chamber or a gas line that continuously discharges a gas specimen into the QIT. The trap chamber is surrounded by a ring, and an extractor plate that has an orifice. The trace molecules within the air may be ionized at the nozzle of the valve by a photo-ionizer. Photo-ionizing at the valve nozzle provides a relatively high density of ionized molecules. The photo-ionizer may be either a pulsed light source or a continuous wave light source. The trace molecules are preferably ionized with energy between 8.0 and 11.0 electron volts (eV). The energy is selected to ionize the trace molecules without fragmenting the trace constituents. An oscillating voltage potential is applied to the ring to trap the ionized trace molecules within the trap chamber. A voltage pulse is applied to the extractor plate to pull the ionized molecules out of the chamber and through the orifice. The extracted ionized molecules are then accelerated to a detector. The monitor may have a time of flight analyzer to measure the mass of the trace constituents in the specimen. Alternatively, the QIT may be operated in a mass-selective instability mode such as by rapidly scanning the radio frequency voltage amplitude to eject ions in sequence of mass out of the QIT and into an ion detector.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
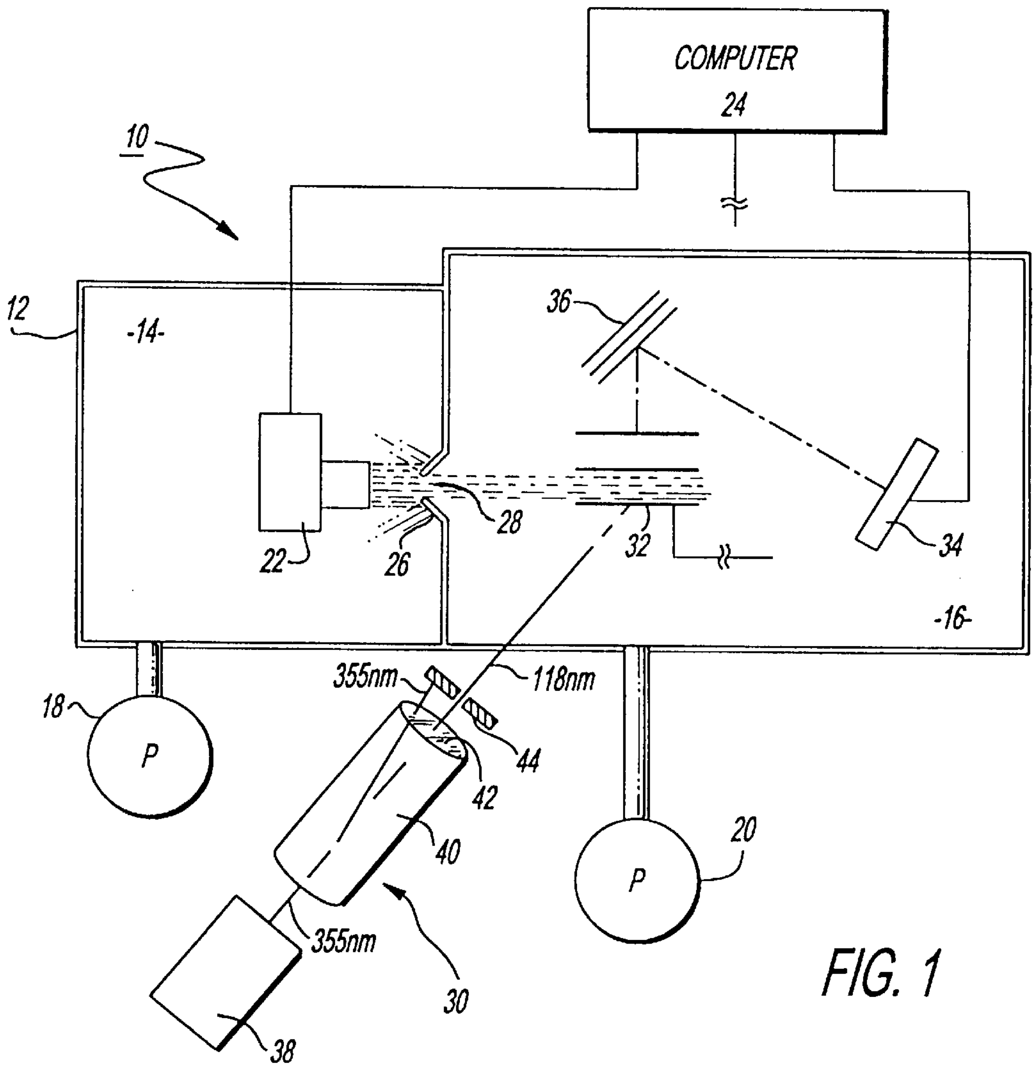
FIG. 1 is a schematic of an environmental monitor of the present invention.

Referring to the drawings more particularly by reference numbers, FIG. 1 shows a monitor 10 of the present invention. The monitor 10 is typically used to measure trace molecular constituents which exist in a gas sample drawn from the ambient atmosphere or from a process line. For purposes of discussion, trace constituents are molecules such as toxic chemicals, illegal contraband, or any other molecules that are to be monitored. Base constituents are naturally occurring molecules such as $N_2$, $O_2$, $CO_2$, CO, $H_2O$, Ar, etc., which typically are not of general interest. The present invention provides a relatively fast and inexpensive monitor that can be used at residential, industrial or military sites to monitor the existence of trace constituents. Trace constituent may be defined as having a concentration of 100 parts-per-million (ppm) or less. However, the present monitor can achieve less than ppm detection levels and in certain cases can detect part-pertrillion (ppt) concentrations.

The monitor 10 includes a housing 12 which has a first inner chamber 14 and a second inner chamber 16. The first inner chamber 14 is coupled to a first pump 18. The second inner chamber 16 is coupled to a second pump 20. The pumps create a vacuum pressure within the inner chambers that is below the ambient atmospheric pressure. Located within the first inner chamber 14 is a valve 22 that discharges a volume of air into the first chamber 14 from the ambient. The actuation of the valve 22 is controlled by a computer 24. The relatively high atmospheric pressure of the ambient air will typically flow into the vacuum chamber without the assistance of a pump or other pressure means.

The monitor 10 includes a skimmer 26 which has an aperture 28 that allows a stream of air to flow into the second chamber 16. The skimmer 26 typically has a conical surface which deflects a portion of the air without interrupting the airstream that flows into the second chamber 16. The second pump 20 will eventually remove the air discharged into the second chamber 16. The first pump 18 evacuates the air sample out of the first chamber 14.

The air that flows into the second chamber 16 is ionized by a photo-ionizer 30. Alternatively, the air sample may be ionized in the first chamber 14 near the orifice of the valve, and the ions are then allowed to drift into the second chamber 16 for detection. The ionized molecules are accelerated by a stack of charged grids 32 toward a detector 34. The monitor 10 may include a reflectron 36 that deflects the ionized molecules from the plates 32 to the detector 34. The reflectron 36 shortens the length of the monitor 10. Additionally, the reflectron 36 narrows the time of flight bandwidth for each trace constituent.

The detector 34 and charged grids 32 are coupled to the computer 24 which can determine the mass of the ionized molecules based on the time of flight between the grids 32 and the detector 34. The time of flight being the interval from when the molecules are ionized and accelerated to the time when the molecules are detected. It being understood that the time of flight is dependent upon the mass of a molecule. Heavy molecules will have a longer time of flight than lighter molecules. The computer 24 may use a look-up table or an equation to associate specific times of flight to the specific masses of the trace constituents. The computer 24 may provide an output reading which indicates the quantities of the trace molecules.

Figure 2:
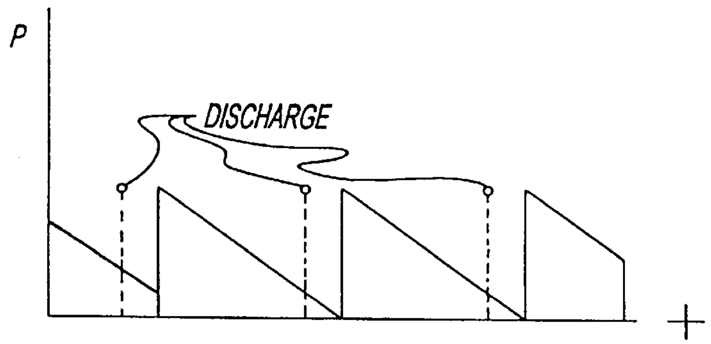
FIG. 2 is a graph showing a pressure curve for a chamber of the monitor.

Although two chambers 14 and 16 are shown and described, it is to be understood that the valve 22, skimmer 26, grids 32 and detector 34 may be located within a single chamber coupled to a single pump. The gas content in the monitor undergoes a cycle in accordance with the pressure curve shown in FIG. 2. The air sample is discharged by the valve 22 when the chamber is at a low pressure (i.e. high vacuum) so that the air flow reaching grids 32 is ionized, accelerated and detected before the chamber pressure rises due to collision of the air flow with the chamber walls. The pressure then decreases as the pumps remove the air allowing the process to be repeated.

The ionizer 30 provides a pulse of light of wavelength 118 nm. This wavelength has two major benefits. First, the photon energy of 10.5 eV lies above the ionization potential of most trace molecules, but below the ionization potential of the base molecules of air. Consequently, typically trace molecules, and not base molecules, are ionized, accelerated and sensed by the detector, which reduces the complexity of analyzing the sample. Second, because ionization occurs by a single-photon just above the ionization potential of the trace molecules, fragmentation is minimized. The detector observes mostly parent ions and not fragment ions which reduces the complexity of analyzing a sample. As a result of the two major benefits just described, the computation required to identify the trace constituents is reduced, so that the test provides relatively fast test results.

Figure 3:
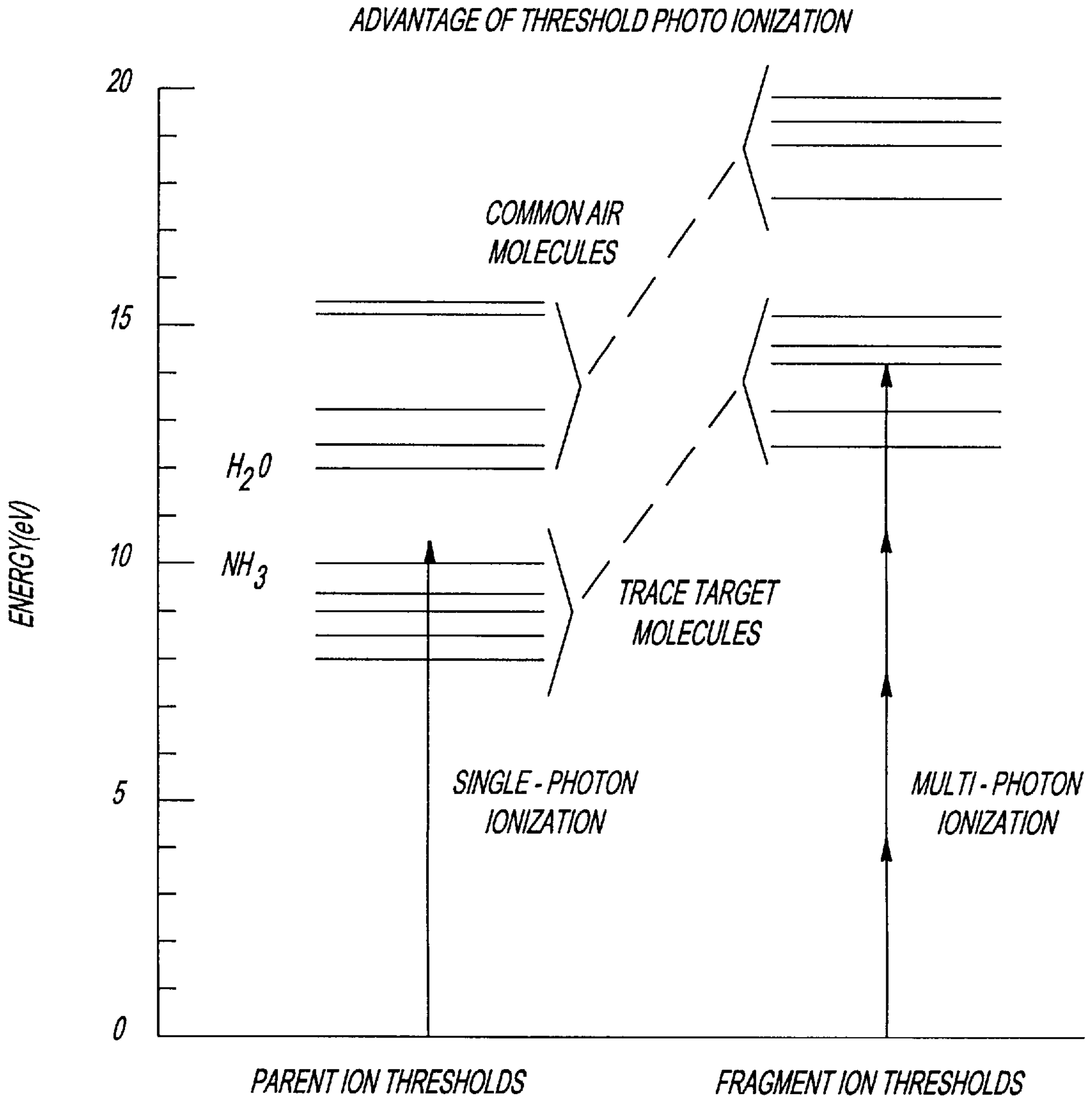
FIG. 3 is a graph showing ionization thresholds.

Referring to FIG. 3, the concept of threshold energies for ionization of trace target molecules vs common air molecules, and threshold energies for fragmentation of these two groups of ionized molecule is illustrated. By selecting a light source which has a wavelength or photon energy within a desired range, trace target molecules of interest can be ionized while avoiding ionization of common air molecules that are not of interest. Furthermore, the wavelength or photon energy can be changed to selectively ionize a subset of trace target molecules, while avoiding other molecules that have ionization thresholds which lie above the photon energy. The use of single-photon ionization within a range of acceptable values also selectively avoids fragmentation of ions that occur at higher energies. This problem exists in the prior art method of multiphoton ionization. The prior art method uses lower photon energy (longer wavelength) sources.

As shown in FIG. 3, a molecule must simultaneously absorb three photons to reach an ionization threshold. Because, these conditions require an intense light source, one cannot control absorption of exactly three photons. Typically, to get a good probability of three-photon absorption, many molecules will absorb 4 or 5 or more photons, ionize and fragment. The fragmentation produces a complicated mass spectrum, as compared to threshold single-photon ionization, which produces a single mass spectrum with essentially only one peak signal for each compound ionized. The advantages may be stated as follows:

Immunity from ionizing the most common 99.9999+% constituents of air (e.g., $N_2$, $O_2$, $CO_2$, CO, $H_2O$, Ar, etc.). This greatly enhances the dynamic range for detecting trace concentrations of target compounds.

Fragmentation-free mass spectra, which considerably simplifies and accelerates analysis.

Figure 4B:
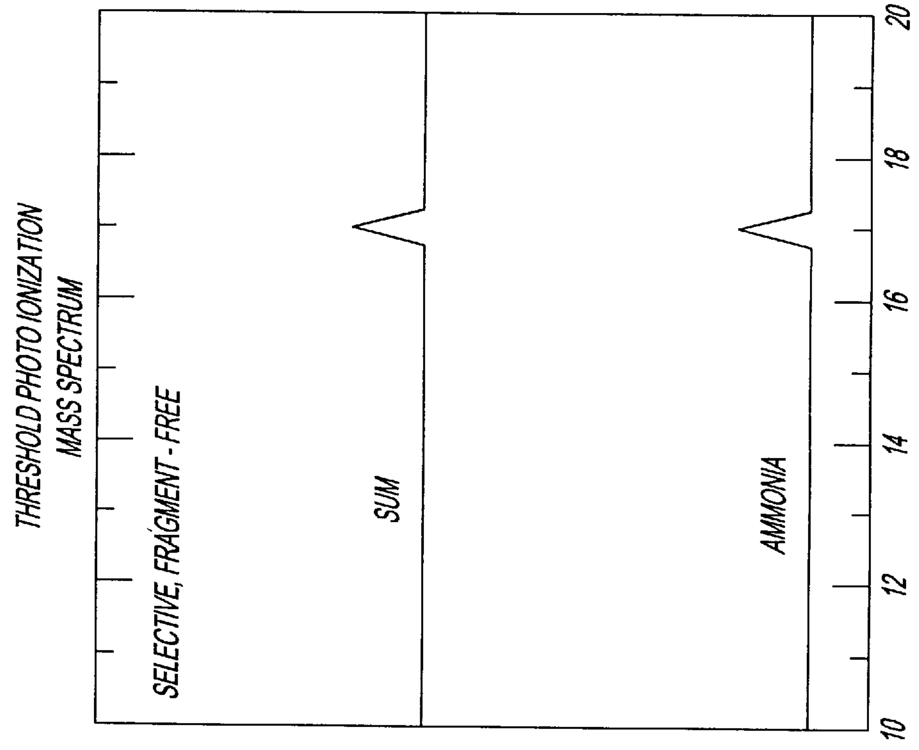
FIG. 4*b* is a mass spectrum graph showing a sample of ammonia water for a monitor of the present invention.
Figure 4A:
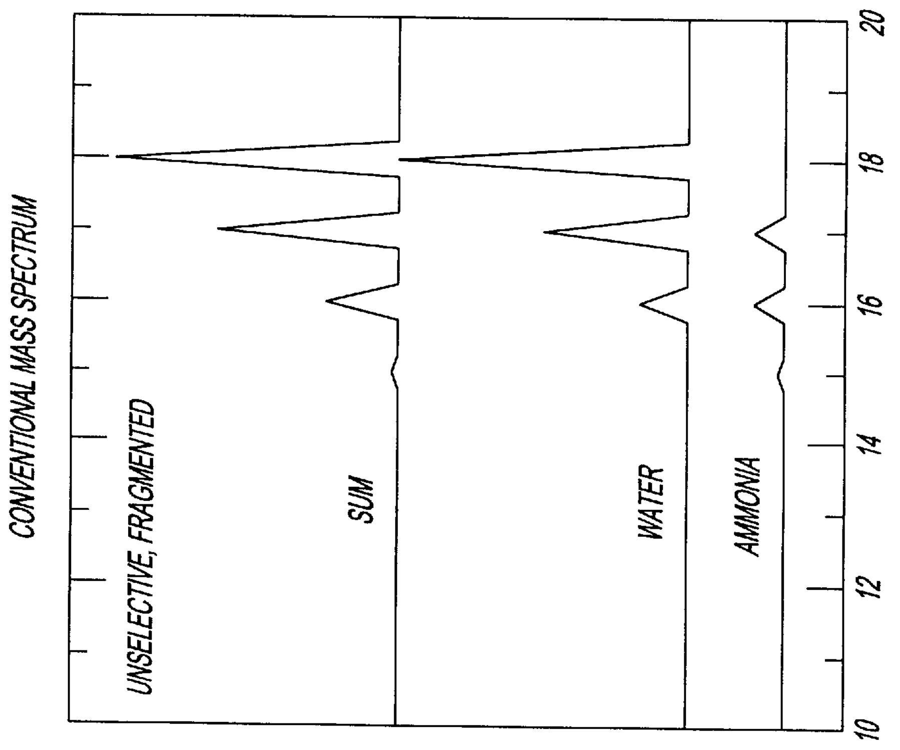
FIG. 4A (PRIOR ART)
FIG. 4*a* is a mass spectrum graph showing a sample of ammonia in water for a monitor of the prior art.

FIGS. 4*a* and 4*b* provides an example showing the detection of trace levels of ammonia ($NH_3$) in the presence of a large abundance of water ($H_2O$). The problem with conventional mass spectrometry is that the signatures for compounds are unselective and fragmented as shown in FIG. 4*a*. The signature for $H_2O$ are peaks at 18, 17, and 16, and the signature for $NH_3$ are peaks at 17 and 16 and traces at 15 and 14. The many peaks are due to molecular ion fragmentation. On the top left of FIG. 4*a* is the sum signal that is observed by the operator. The signal looks like $H_2O$ because it is in greater abundance, and the $NH_3$ is lost under the peaks. Threshold photoionization solves the problem by using a photon energy that is too low to ionize water, but high enough to ionize ammonia. This is shown in the energy diagram in FIG. 3 and is observed in the spectrum on FIG. 4*b*. In this example, $NH_3$ is ionized selectively. One should also note that the signature for $NH_3$ in the threshold photoionization spectrum is a single line rather than multiple lines by conventional mass spectrometry. The advantages of fragment-free mass spectrometry is more apparent in the next example.

Figure 5B:
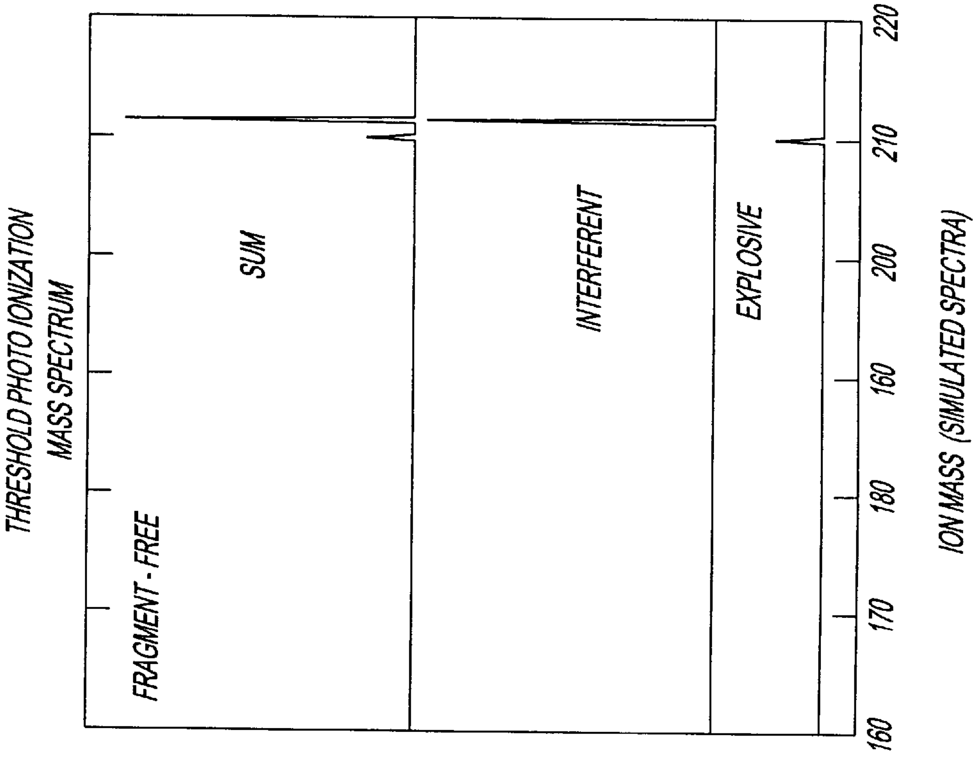
FIG. 5*b* is a mass spectrum graph showing a sample of an explosive compound with other similar compounds for a monitor of the present invention.
Figure 5A:
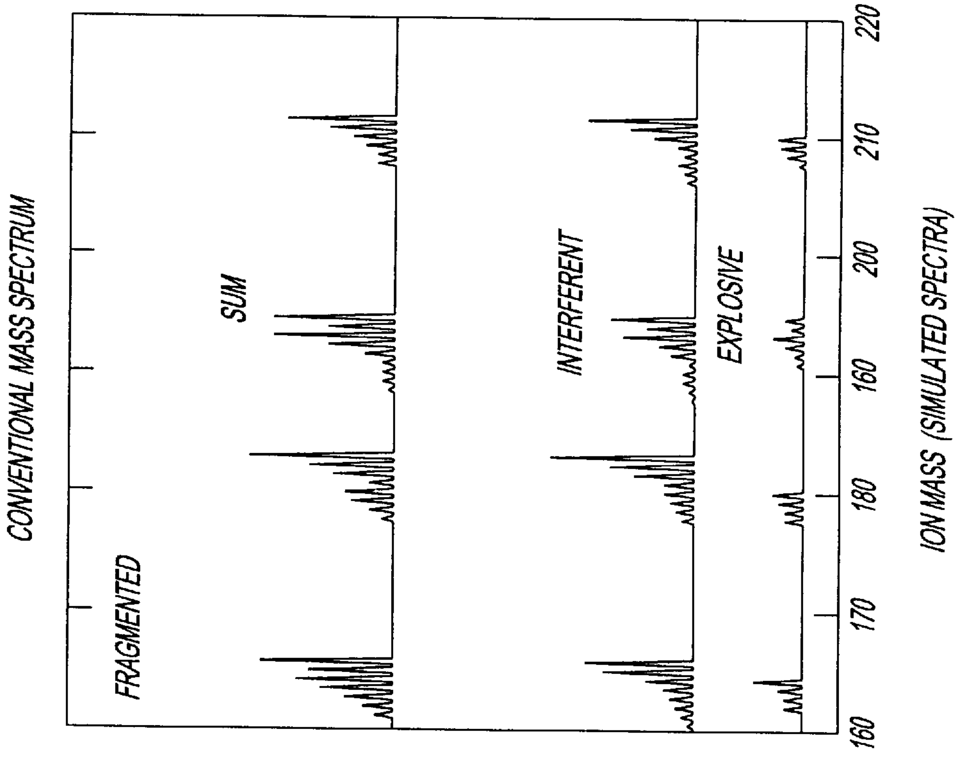
FIG. 5A (PRIOR ART)
FIG. 5*a* is a mass spectrum graph showing a sample of an explosive compound with other similar compounds for a monitor of the prior art.

The problem of fragmentation by conventional mass spectrometry causes a cluttered series of signals that can hide trace compounds. FIGS. 5a and 5b show detection of a trace amount of an explosive compound in the presence of a large amount of a similar compound that is referred to as an interferent. There are many lines for each compound due to molecular fragmentation. The composite sum signal is the actual detected signal. Low levels of explosives are hidden beneath the peaks of the more abundant interferent compound. The fragmentation problem is solved using threshold photoionization. On the lower right of FIG. 5b, it is seen that the signature for each compound has a single peak. Hence, the composite spectrum on the upper right clearly shows each compound, even though one is in much greater abundance.

Referring to FIG. 1, the 118 nanometer pulse of light is preferably derived from a Nd:YAG laser 38 which generates light at a wavelength of 355 nm. The 355 nm light is directed to a Xenon frequency tripling cell 40 which generates a third harmonic that has a special wavelength of 118 nm. The frequency tripling cell 40 may include a $MgF_2$ lens assembly 42 which focuses the 118 nm light through an aperture 44 and into the second chamber 16. The lens 42 focuses the 355 nm light into the aperture 44 so that the 355 nm light does not enter the chamber 16. As an alternate embodiment, the cell 40 may contain a wedge (not shown) that reflects the 118 nm light into the second chamber 16 and refracts the 355 nm light away from the chamber. Although an aperture stop is shown and described, it is to be understood that both the 118 nm light and the 355 nm light can be directed into the chamber 16. The 118 nm light is focused onto the specimen. The 355 nm light has a focal point away from the gas specimen so that the 355 nm light has an insignificant effect on the specimen. It is to be understood that the light is directed into the sample in a direction parallel with the grid plates 32, wherein the light does not strike the grid plates 32. The cell 40 is shown at an angle in FIG. 1 to simplify the drawing.

As another embodiment the 355 nm light may enter the tripling cell 40 parallel, but off of the centerline, so that the 118 nm and 355 nm light exit the cell along different axes. The 355 nm light can then be blocked. In this embodiment the 355 nm light may enter the tripling cell 40 along the centerline, such that the 118 nm and 355 nm light exit the cell overlapped along the same axis. This option permits the 355 nm light to fragment the ions formed by the 118 nm light, which can be useful to determine the structure of parent ions. Although a 355 nm Nd:YAG laser is described, it is to be understood that other light sources can be implemented. For example, the monitor 10 may utilize a tunable laser which can be selected to provide an output at different wavelengths.

The computer 24 provides an output signal to actuate the valve 22 and discharge a volume of air into the second chamber 16. The photo-ionizer 30 ionizes the air sample or process gas sample within the second chamber 16 with light at 118 nm. The ionized trace constituents have a positive charge. The computer 24 can provide an output signal to create a positive charge on adjacent grid plates 32. Alternatively, the plates can have continuous voltages to accelerate the ions. The accelerating potential on the plates accelerate the ionized trace constituents toward the detector 34. The neutral constituents remain adjacent to the plates 32. The accelerated ionized trace constituents are detected by the detector 34. Because the laser pulse is typically very short (e.g. 5–20 nanoseconds) ions are formed instantly. The ions therefore move at the same time. Therefore the arrival times at the detector for each ion mass can be measured with great precision.

The computer 24 receives signals from the detector 34. The computer 24 then calculates the time interval between when the plates 32 were charged and when the detector 34 detected a constituent(s). The computer 24 then matches the time of flight data with a mass and provides an identification of the trace constituents. The monitor may detect a number of constituents which have different time of flight intervals. The air sample is eventually drawn out of the chambers by the pumps so that the process can be repeated. The test cycle can be repeated periodically to continuously monitor a test site or a process line.

Figure 6:
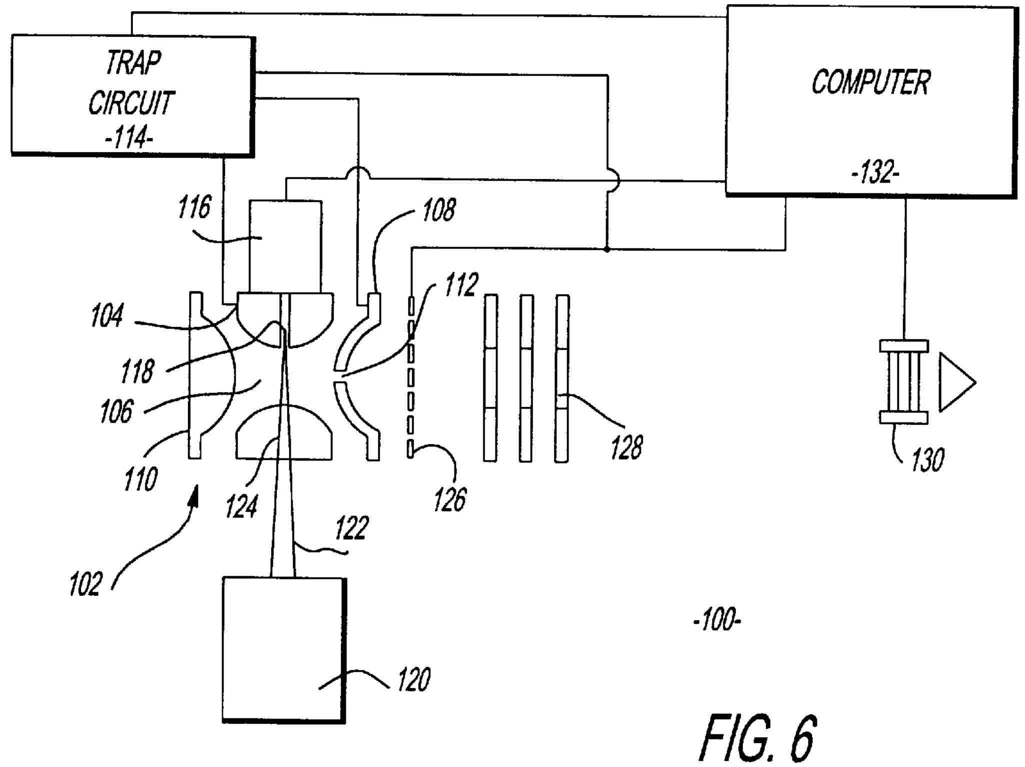
FIG. 6 is a schematic showing an alternate embodiment of the monitor.

FIG. 6 shows an alternate embodiment of an environmental monitor 100 that utilizes a quadrupole ion trap (QIT) 102 to increase the ionization efficiency of the monitor. The ion trap 102 includes an annular ring 104 that surrounds a trap chamber 106. The trap chamber 106 is enclosed by an extractor plate 108 and a barrier plate 110. The extractor plate 108 has an orifice 112 that allows ions to be extracted from the trap chamber 106. The annular ring 104, extractor plate 108, and barrier plate 110 are coupled to a trap circuit 114. The trap circuit 114 provides a voltage potential to the ring 104 and the plates 108 and 110. The ring 104 is typically provided with a voltage at a radio frequency (RF).

A pulse valve 116 discharges a gas specimen into the trap chamber 106 through a channel 118 in the annular ring 104. The monitor 100 also contains a light source 120 which emits a light beam 122 that is directed into the trap chamber 106 through an aperture 124 in the annular ring 104. The light source 120 may include a pulsed Nd:YAG laser which emits light at 355 nm that is tripled to 118 nm as shown in FIG. 1. As an alternate embodiment, the light source 120 may be a pulsed Krypton (Kr) arc lamp that emits light at 116 nm and 122 nm or another radiation source that emits light at desirable ionizing energies. In general it is desirable to provide a light source which emits radiation energy between 8.0 and 11.0 electron volts (eV).

The monitor 100 further includes an accelerator plate 126, an Einzel lens 128 and a detector 130 that are coupled to a computer 132, which together provide a time of flight analyzer. The trap circuit 114 may also provide pulses of energy to the accelerator plate 126. The monitor 100 typically contains a vacuum system as described with reference to FIG. 1.

In operation, the pulsed valve 116 discharges a gas specimen through the channel 118 of the annular ring 104. The light source 120 is also pulsed to direct the light beam 122 into the gas specimen. The light beam photo-ionizes the trace molecular constituents of the specimen. The light beam 122 is directed onto the opening of the channel 118 where the specimen has the highest gas density. The dense specimen and high energy pulsed light beam create a relatively high density of ionized molecules. The trap 102 is not electrically pulsed during the photo-ionization process so that ions and electrons created by the light beam 122 striking the metal components of the trap 102 are not propelled into the trap chamber 106.

After ionization the trap circuit 114 provides a voltage to the annular ring 104 to trap the ionized molecules in the trap chamber 106. The trap circuit 114 then pulses the extractor plate 108 to pull the ionized molecules out of the trap chamber 106 and through the orifice 112. An opposing voltage may be applied to plate 110 to assist in ion extraction. The ionized molecules are then accelerated to the detector 130 by the accelerator plate 126. The computer 132 analyzes the specimen based on the time of flight of the molecules.

Figure 7:
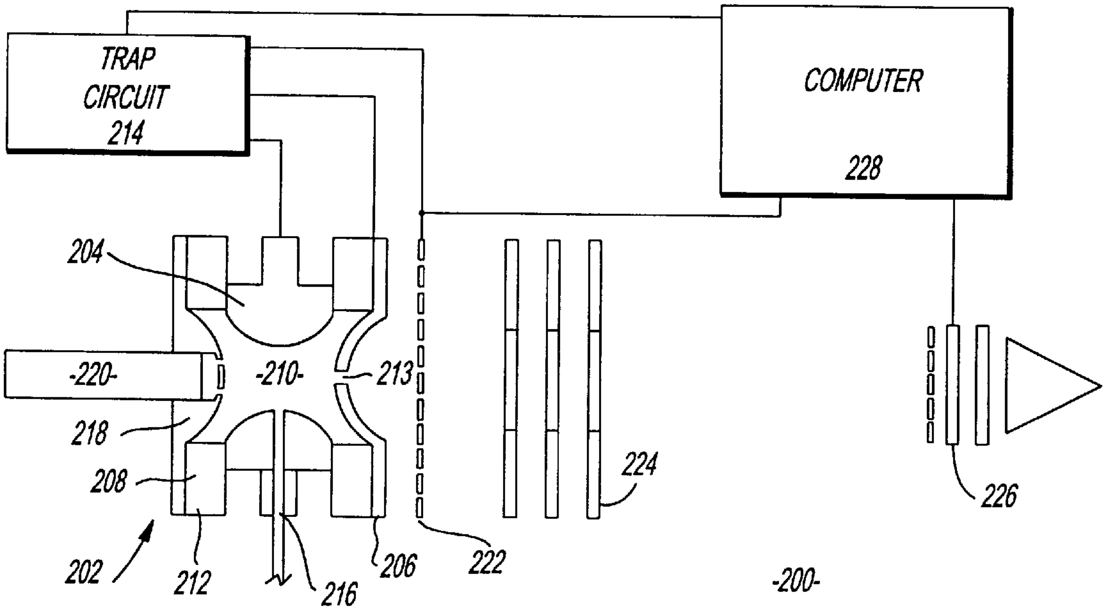
FIG. 7 is a schematic showing an alternate embodiment of the monitor.

FIG. 7 shows another embodiment of a monitor 200 which has a continuous photo-ionization process in a quadrupole ion trap 202. The trap 202 has an annular ring 204, extractor plate 206 and a barrier 208 that surround a trap chamber 210. The trap 202 may also have dielectric ceramic spacers 212 that enclose the chamber 210. The extractor plate 206 has an orifice 213 that allows ions to be extracted from the trap chamber 210 and to pump the chamber 210 when ceramic spacers are used to seal the chamber. The ring 204 and plate 206 are connected to a trap circuit 214.

The ring 204 or ceramic spacer 212 contains a channel 216 that allows a continuous stream of gas to enter the trap chamber 210. The barrier 208 has a window 218 that allows a light source 220 to direct a light beam into the trap chamber 210. The light source 220 is preferably a continuous wave lamp. In the preferred embodiment, the light source 220 is a RF or DC discharge Kr lamp that emits a wavelength of 116 nm and 122 nm. In general the light source 220 should emit radiant energy between 8.0 and 11.0 eV.

The monitor 200 also has an accelerator plate 222 and a detector 226 that are coupled to a computer 228, which together provide a time of flight analyzer. The monitor 200 may have an Einzel lens 224 or deflection plates (not shown) to direct the ions to the detector 226. The components of the monitor 200 may be coupled to a vacuum system (not shown) that lowers the pressure within the chamber.

In operation, a gas specimen is discharged into the trap chamber 210 through the channel 216. The light source 220 provides a continuous light beam which photo-ionizes the gas, as the specimen is being continuously discharged into the chamber 210. The trap circuit 214 applies a voltage to the ring 204 to trap the ionized molecules in the chamber 210.

The extractor plate 206 is pulsed to pull the ionized molecules out of the chamber 210 and through the orifice 213. The ionized molecules are accelerated by the plate 222 and detected by the detector 226. The computer 228 analyzes the specimen based on the time of flight of the molecules. The embodiment shown in FIG. 7 provides a relatively inexpensive monitor that can be assembled as a hand held portable unit. An alternate embodiment that enables an even more compact design for portability is to operate the QIT in mass-selective instability. By rapidly scanning the radio frequency voltage amplitude on the ring electrode, or applying a radiofrequency scanner to the end plates, the trapped ions are ejected from the QIT in sequence of mass. An ion detector positioned just outside the QIT collects the ion signal for each mass. By way of example, the trap circuit may rapidly increase the amplitude of the RF voltage. Molecules with a relatively light mass will be initially ejected from the QIT, wherein heavier molecules will be ejected from the QIT at a later time with an increase in the voltage amplitude. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A monitor that detects at least one trace molecule which has a mass, in a gas specimen, comprising:

a ring that surrounds a trap chamber;

an extractor plate that has an orifice in fluid communication with said trap chamber;

a valve that discharges the gas specimen and the trace molecule into said trap chamber through a valve opening;

a photo-ionizer that directs a light beam onto said valve opening and ionizes the trace molecule;

a trap circuit that provides a first voltage to said ring to trap the ionized trace molecule in said trap chamber and provides a second voltage to said extractor plate to pull the ionized trace molecule out of said trap chamber and through said orifice; and a mass detector that detects the mass of the ionized trace molecule.

2. The monitor as recited in claim 1, wherein said photo-ionizer includes a pulsed laser.

3. The monitor as recited in claim 2, wherein said valve is pulsed to provide the gas specimen.

4. The monitor as recited in claim 1, wherein said photo-ionizer includes a pulsed lamp source.

5. The monitor as recited in claim 1, wherein said photo-ionizer includes a continuous wave light source.

6. The monitor as recited in claim 5, wherein said valve provides a continuous gas specimen.

7. The monitor as recited in claim 1, wherein said trap circuit does not provide a voltage to said ring and said extractor plate when said photo-ionizer ionizes the trace molecule.

8. A method for detecting at least one trace molecule which has a mass, in a gas specimen, comprising the steps of:

a) discharging the gas specimen and the trace molecule into a trap chamber through a valve opening;

b) directing a light beam onto said valve opening to photo-ionize the trace molecule;

c) extracting the ionized trace molecule from said trap chamber; and d) detecting the mass of the accelerated ionized trace molecule.

9. The method as recited in claim 8, wherein the trace molecule is photo-ionized with a pulse of radiant energy.

10. The method as recited in claim 8, wherein the trace molecule is photo-ionized with a continuous wave of radiant energy.

* * * * *